May 19, 1970    A. E. ROSENBLAD    3,512,239
METHOD OF FORMING DIMPLED PLATE HEAT EXCHANGER ELEMENTS
BY THE USE OF HYDROSTATIC PRESSURE
Filed April 19, 1967    2 Sheets-Sheet 2
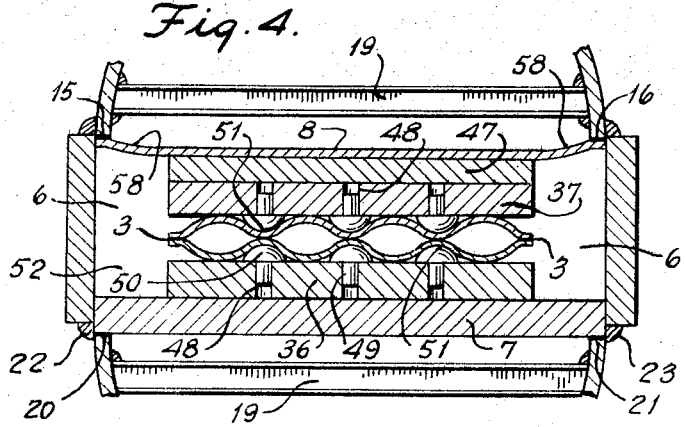
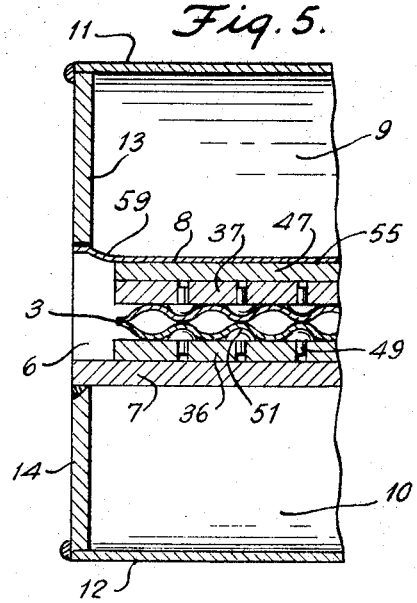
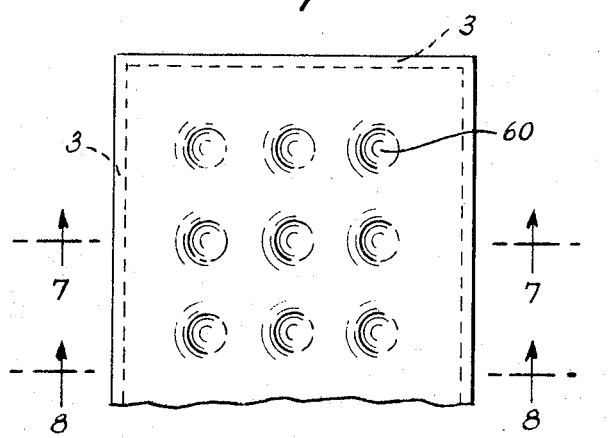
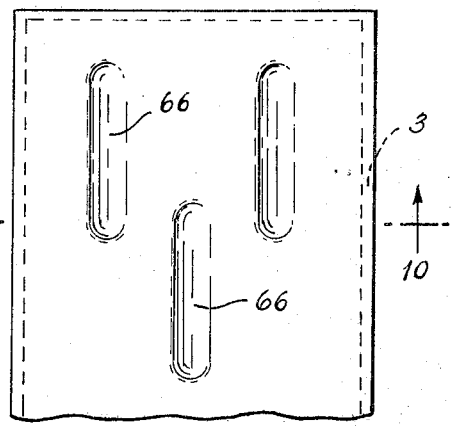
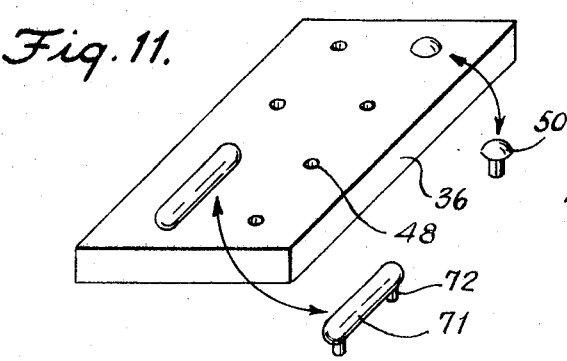
AXEL E. ROSENBLAD
INVENTOR.
BY
ATTORNEY.

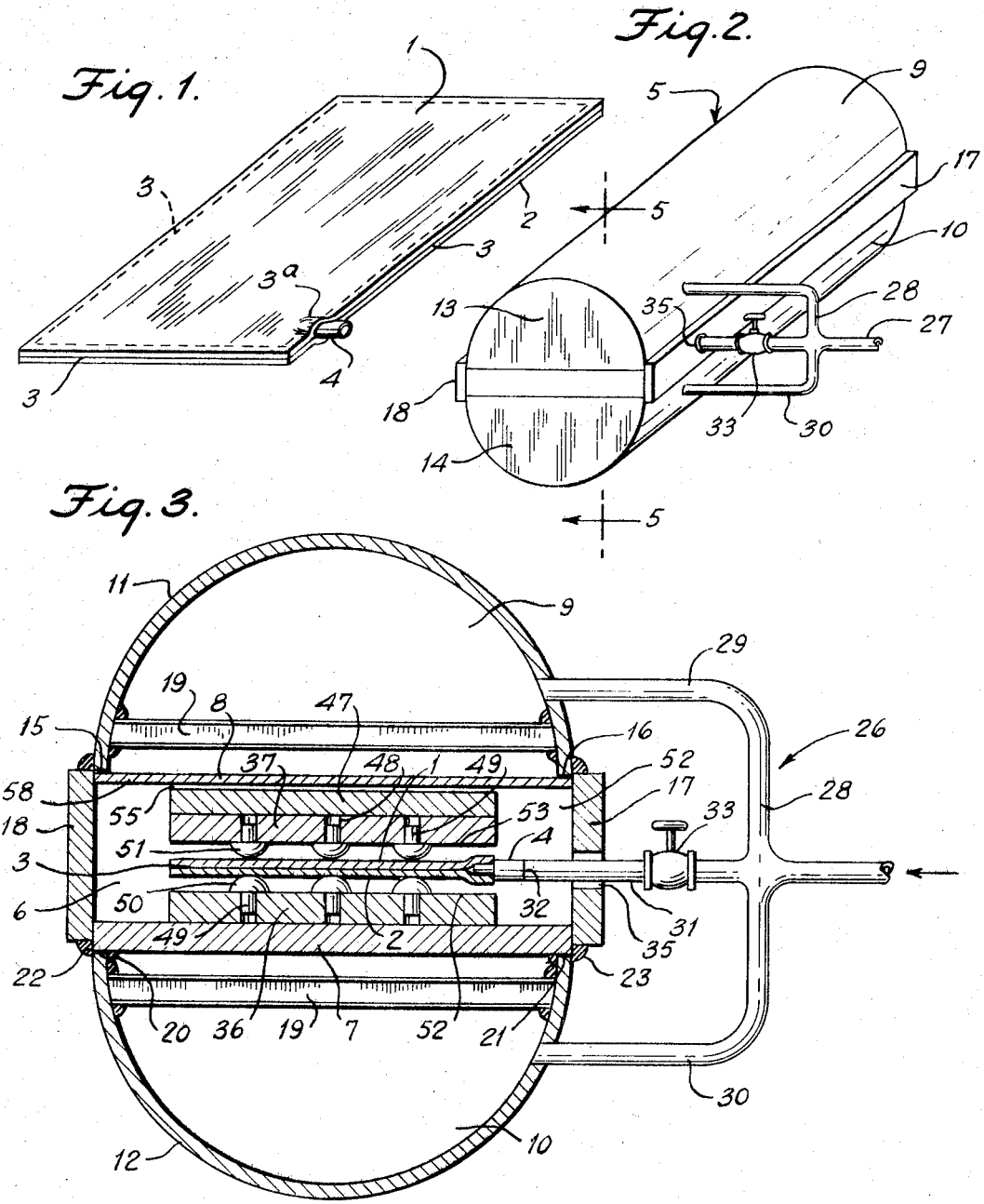

United States Patent Office 3,512,239
Patented May 19, 1970

3,512,239
METHOD OF FORMING DIMPLED PLATE HEAT EXCHANGER ELEMENTS BY THE USE OF HYDROSTATIC PRESSURE
Axel E. Rosenblad. Princeton, N.J., assignor to Rosenblad Corporation, Princeton, N.J., a corporation of New York
Filed Apr. 19, 1967, Ser. No. 631,990
Int. Cl. B21d 53/04; B23p 15/16
U.S. Cl. 29—157.3       7 Claims

ABSTRACT OF THE DISCLOSURE

A method for forming dimpled plate heat exchanger elements where a pair of flat, superposed, plates is welded together around their edges while in the flat. Then at one position the plate edges are separated to form a nozzle surrounding a passage into the interior between the plates. The plates are held in a fixture itself under pressure and having projections engaging the outer face of at least one of the plates at spaced positions to hold them in engagement and against lateral movement at those positions. The fixture allows controlled lateral expansion of the plates between those held positions. Hydrostatic pressure is applied through the passage to expand portions of at least one of the plates away from the other to form channels between the plates. The apparatus also employs hydrostatic, or other suitable pressure, to hold the fixture in closed position. The plates are spot welded together at their engaged positions preferably after the forming is effected.

BACKGROUND OF THE INVENTION

Field of the invention

The method and apparatus of the invention are particularly applicable to the forming of heat exchanger elements where channels for the flow of a heat exchange fluid are provided between a pair of opposed plates. To strengthen these plates and protect them against a deformation due to pressure, they are usually dimpled, or provided with other projections extending toward each other at spaced positions throughout the plate area in accordance with the certain pattern or "pitch." Commonly these projections are spot welded together. The edges of the plates are seamed, or welded, together except at positions where fluid is introduced into and withdrawn from the channels between the plates. The invention then is concerned with a simple, quick, economical method of forming such heat exchange elements made up of pairs of plates.

DESCRIPTION OF THE PRIOR ART

In a prior art manufacture of heat exchange elements made up of pairs of plates formed apart to provide channels between them, the plates have been individually formed. This has been done by mechanical action in heavy, expensive presses equipped with large expensive dies. The individual plates had to be most accurately formed so that when a pair of them were faced against each other their edges would be aligned for seaming, or welding, together and their opposed projections would line up accurately for spot welding.

SUMMARY OF THE INVENTION

The invention greatly expedites, simplifies and economizes on the forming of heating elements for plate type heat exchanged and on the apparatus required for effecting that forming. In place of the individual mechanical forming of the plates, as in the prior art, followed by securing them together, the invention forming starts with a pair of plates, lying face to face, being secured together by welding around their edges when they are in easy condition to hold. They are then assembled in a fixture having opposed elements which is indexed around the plates and which is then put under pressure and has means engaging and holding the plates together at spaced positions, or at a definite pitch, within the plate area. Portions of the plate between the held positions are then expanded, or forced, away from each other by introducing hydrostatic pressure between the plates through a passage formed through their joined edges.

In forcing the plate portions away from each other the metal must be stressed beyond the yield point so it will retain its new shape. Nevertheless the extent to which the plate portions are expanded, or forced away from each other, is controlled by the position of the opposed surfaces of the fixture plates with respect to the height of the means extending therefrom to hold the plates together both in the flat and in the expanded form. Preferably the fixture is positioned in a pressure vessel in which hydrostatic pressure is first applied to act on the fixture and effect the holding of the plates between the elements of the fixture before hydrastatic pressure is applied between the plates. The apparatus for carrying out this method is also novel and forms part of the invention.

Once the heating element is formed by the action of hydrostatic pressure, its opposed dimples, or projections, are spot welded together. Also, another opening is formed through the edge. This other opening, along with the initial opening used for introducing the hydrostatic pressure between the plates, provide for the flow of fluid through the element in the use of it. In the method and apparatus of the invention there are no mechanical elements to move, no heavy parts to apply, nor bolts to tighten up. Furthermore, and what is of substantial advantage, the deformed portions of the plates having been subjected to uniform pressure, any one part is just as strong as any other.

BRIEF DESCRIPTION OF THE DRAWING

In the accompanying drawing:

FIG. 1 is a perspective view of a pair of plates secured together by welding around their edges and equipped with a nozzle, ready to be positioned between the fixture elements for introduction into the pressure vessel.

FIG. 2 is a perspective view of a pressure vessel for carrying out the method of the invention.

FIG. 3 is an enlarged transverse vertical section of such vessel with a fixture and plate assembly therein prior to application of the hydrostatic pressure.

FIG. 4 is a similar partial section showing the relationship of the parts after the pressure has been applied.

FIG. 5 is a fragmentary longitudinal sectional view on line 5—5 of FIG. 2 showing the relationship of the fixture-plate assembly to an end of the pressure vessel.

FIG. 6 is a plan view of a characteristic type of plate heat exchanger element formed by the apparatus of FIGS. 2–5.

FIG. 7 is a sectional thereof taken on line 7—7 of FIG. 6.

FIG. 8 is a section thereof taken on line 8—8 of FIG. 6.

FIG. 9 is a view similar to FIG. 6 of a heat exchanger element formed somewhat differently.

FIG. 10 is a section taken on line 10—10 of FIG. 9; and

FIG. 11 is an exploded perspective view of one of the fixture plates showing the application of different projecting elements thereto.

DESCRIPTION OF THE PREFERRED EMBODIMENT

In the accompanying drawing the presently preferred apparatus for carrying out the method of the invention, and the product resulting therefrom, are shown in the various views. It is to be understood, however, that such illustration with its accompanying description is purely for illustrative and not for limiting purposes, inasmuch as one skilled in the art may well devise variations of the method of the invention without departing from the spirit and scope thereof, as well as devising different forms of apparatus for the carrying out of that method.

In FIG. 1 there is shown the pair of sheet metal plates which serve as a starting point for the forming of a heat exchanger element in accordance with the invention. These plates, 1 and 2, are symmetrical and, as seen in FIG. 1, plate 1 overlies plate 2 and their edges are welded together as seen at 3 to provide a tight joint and pressure proof and leak-proof seam between them all the way around their peripheries with the exception of one position indicated at 3a. At the position 3a each of the plates is in a sense scalloped away from the other for the securement of a nozzle 4 therein. This nozzle 4, as will be pointed out hereinafter, is suitably engaged by a pressure hose so that water under pressure may be introduced between the plates to expand portions of them away from each other, thereby forming fluid channels or passages between the plates.

The pressure vessel in which the expansion of the metal of the plates is effected is shown generally in FIG. 2 and in section in more detail in FIGS. 3, 4 and 5. This vessel, generally indicated at 5, has an intermediate receiving slot 6 sized for the slidable reception of the fixture carrying the plates to be expanded. This slot is bordered by a heavy elongated base plate 7 which extends longitudinally throughout the length of the pressure vessel, and an opposed upper sheet 8 of lighter and relatively flexible material. This sheet 8 is also coextensive with the base 7 throughout the length of the pressure vessel.

The pressure vessel also is provided with upper and lower pressure chambers 9 and 10. These chambers, as shown here, have generally hemi-cylindrical bodies 11 and 12 and end plates 13 and 14, all of sufficient strength and secured with strong enough joints to hold against the internal pressure within the chambers.

The hemi-cylinder 11, as seen in FIGS. 3 and 4, is secured along its longitudinal free edges 15 and 16 not only to the longitudinal borders of the flexible sheet 8, but also to the heavy closing strips 17 and 18 extending longitudinally throughout the full length of the slot 6 thereby being coextensive with the hemi-cylinders 11 and 12, as well as the base plate 7 and the flexible plate 8. These joints at the positions 15 and 16 are preferably welds of adequate strength to resist the hydrostatic pressure built up within the chamber 9. The strips 17 and 18 form the side boundaries of the slot 6.

Similarly the hemi-cylinder 12 is secured along its free edges 20 and 21 to the thick base plate 7 of the slot 6. These joints, or welds, are merely between the free edges 20 and 21 and the base plate 7 and are adequate to resist pressure due to the thickness of the base 7 to which the edges 20 and 21 are joined. The lower side of the side strips 17 and 18 need merely be joined to the longitudinal edges of the base 7 by the welds indicated at 22 and 23 in FIGS. 3 and 4. I beams 19 are provided to reinforce the hemi-cylinders 11 and 12 against pressure distortion at spaced positions along their lengths.

Introduction of hydrostatic pressure into the chambers 9 and 10 and through the nozzle 4 into the space between the plates 1 and 2 is effected by the pipe system generally shown at 26. This system is made up of a main 27, a manifold 28, pipes 29 and 30, communicating respectively with the interiors of chambers 9 and 10, and a central pipe 31 suitably coupled at its inner end 32 to the nozzle 4. It is essential to the invention to apply pressure in the chambers 9 and 10 to make sure the fixture is clamped tight before pressure is introduced through the nozzle 4. This locks the element to be formed in place in the fixture and prevents relative movement between fixture and element. Also it may be desired to have a higher unit pressure in the chambers 9 and 10 then between the plates 1 and 2. Thus a valve 33 is provided in the pipe 31 for closing off that pipe until it is time to apply pressure between the plates 1 and 2. The valve 33 may also be used to throttle the flow through the pipe 31.

The closing strip 17 has an opening 35 therethrough for passage of the pipe 31. This need not be tight or close fit because there is no pressure applied to the space in the slot 6 surrounding the fixture plate assembly.

The height of the slot 6 is so chosen as to slidably receive the fixture and plate assembly in position to be held in the pressure vessel while hydrostatic pressure is introduced through the nozzle 4. The fixture is essentially composed of heavy top and bottom plates 36 and 37 formed to overlie the assembly of plates 1 and 2 throughout the length and breadth thereof. The fixture plate 37 has a backup plate 47 seated on top of it. This extends up close to, but spaced a short distance from, the flexible sheet 8 when that sheet is in relaxed state.

The faces of the fixture plates 36 and 37 however do not, in the relaxed position of the assembly, come into contact with the plates 1 and 2. This is because, as here illustrated, the plates 36 and 37 are provided with spaced bores 48 extending through them which receive the shanks 49 of the studs 50 whose rounded projecting heads 51 have flat bases overlying the faces 52 and 53 of the fixture plates 36 and 37 with the rounded portions projecting away from those faces to engage the plates 1 and 2 when they are positioned in the fixture. Opposed pairs of studs 50 extending at aligned positions from both of the plates 36 and 37, engage the metal of the assembled plates 1 and 2, with their rounded heads 51, from opposite sides of the plate assembly. The heads 51 engage such plates to provide tight frictional engagement therewith at the engaged positions and to prevent sliding of the plates with respect to the stud heads. Should the metal be drawn at these tight positions the studs will still hold tight since the pressure will still be on them. It is also desirable that the tops of the stud heads 51 be flattened so as to retain the initially engaged portions of the plates in their flat form. The formed plates will thus have opposed small flat areas to facilitate the welding of them together.

It is thus apparent that, at the outset, and before any hydrostatic pressure is applied to the space between the plates 1 and 2, the plate assembly of FIG. 1 is held in the fixture and opposite sides of it within its borders are engaged at the desired positions by opposed stud heads 51. Assuming then that a complete assembly of fixture plates, and back up plate, has been effected with a pair of edge seamed flat plates positioned therebetween, such assembly is then ready to be slid the slot 6 provided therefor in the pressure vessel 5. This can be readily done, for, as seen in FIG. 3, there is ample space indicated at 52 between the sides of the fixture and the closing strips 17 and 18 of the pressure vessel. Also there is a small space 55 between the flexible plate 8 and the upper surface of the backup plate 47. This space 55 need be no more than necessary to permit free sliding movement of the fixture and plate assembly into and out of the slot provided for it. Furthermore, as seen in FIG. 4, after the hydrostatic pressure has been applied in the pressure chambers 9 and 10, the space 55 is eliminated.

Elimination of the space 55 results from the plate 8 being sufficiently flexible that it is readily flexed downward by the hydrostatic pressure in the chamber 9 to engage the upper surface of the back up plate 47. The plate 8 flexes sufficiently throughout its longitudinal edge portions 58 which overlies the spaces 52 alongside of the fixture assemblies as well as at its end portions 59 overlying similar spaces there, to insure the engagement.

The strong hydrostatic pressure causing this deflection of the plate 8 is imparted through that plate to the backup plate 47, thence to the fixture plate 37, and to the latter's stud heads 51. The heads 51 engage the upper plate 1 and hold the plates 1 and 2 tightly against the stud heads 51 carried by the lower fixture plate 36. The plate 36 is supported on the heavy, relatively unyielding support plate 7, so tight holding of the element plates between opposed sets of stud heads 51 is effected. The heavy support plate 7 is also supported by hydrostatic pressure from beneath it in the chamber 10 where the unit pressure is generally the same as that in chamber 9.

The hydrostatic pressure in the chambers 9 and 10 may, if desired, be greater in terms of pounds per square inch than that which is introduced between the plates to be expanded into a heating element. Normally, however, greater unit pressure is not necessary and the same head of pressure can be used in both cases, since the areas of plates 7 and 8 on which the hydrostatic pressure in the chambers 10 and 9 is applied are greater than the areas receiving the pressure within the plate assembly being expanded. Hence the overall force holding the fixture together is materially greater than that acting to open it up or force it apart. It is essential to apply hydrostatic pressure in the chambers 9 and 10 before introducing it through the nozzle 4. This, as well as unit pressure variation, is achieved through manipulation of the valve 33.

As a non-limiting example it has been found that the hydrostatic pressure of 300 pounds per square inch acting on a good grade of 18 gauge steel, even though the same may be stainless steel, is effective for forming the heating element into the shape desired. In fact, one grade of stainless steel of this gauge when subjected to this pressure passes its yield point but the structure of the steel is such that it then becomes stronger.

It is believed to be apparent from the foregoing that, depending upon the shape and disposition or pitch of the studs or projections 50, hollow heat exchange elements variously contoured can be readily formed by employing the method and apparatus of the invention. It is merely necessary to hold the pair of securing plates at the desired positions, then effect the forming or contouring of them by applying sufficient hydrostatic pressure between them. The extent to which portions of the heat exchanger plates will be expanded away from each other depends upon the height of the studs above the inwardly facing surfaces of the fixture plates, since those surfaces limit the expansion. When the proper steel is used it will flow under the action of the hydrostatic pressure to give a resultant structure of uniform strength throughout. Though the steel may flow somewhat past the studs 50, the plates 1 and 2 are still held tightly as any thinning would merely result in the studs 50 moving toward each other through the action of the hydrostatic pressure in the chambers 9 and 10.

Referring now to FIGS. 6, 7, and 8, where a finished dimple plate is shown, with the dimples on a uniform or symmetrical pattern or pitch, it can be readily seen that, in the lines where the dimples 60 exist, passage between the plates is restricted to a plurality of separate passages 61 between the sets of dimples and between the dimples and the edges of the plate produced, such passages being provided by the expanding of the metal at the opposed positions 62. Between the rows of dimples, as seen in FIG. 8, the plates are expanded away from each other all the way across the heating element to form an open channel 63 bordered by outwardly expanded plate portions 64 and 65.

Where the opposed dimples 60 engage, the plates can be readily spot welded together. Preferably this is done after the forming is completed. If it were attempted before forming one could not be sure of accurately determining that the weld would coincide with the positions where the stud heads 51 engage the plates. Furthermore, it is desirable to allow for the possibility of the metal flowing somewhat past the stud positions as the plates are being formed. Desirably the stud heads are flattened at their tops to retain the opposed plates in flattened form at the bases of the dimples. These flats are preferably larger than the spot welds to be formed in them.

FIGS. 9 and 10 show another form of heat exchanger element which can readily be made employing the method and apparatus of the inventions. Here, instead of dimples, elongated recessed portions 66 are formed in the plates. These, as shown in FIG. 10, have their engaging portions welded together along lines 67. Passages 68 are provided at either side of the recess portions 66 by virtue of the opposed plate portions 69 and 70 being expanded away from each other.

FIG. 11 shows how either one or both of the fixture plates 36, and 37, can readily be equipped with different types of projections. As an example, besides the stud 50, elongated projections 71 can be employed having shanks 72 which engage adjacent ones of the bores 48. These would produce an element as in FIG. 9. Longer, or differently shaped projections, can be employed as desired, having stud shanks as needed to engage the appropriate ones of the bores 48. Various other combinations can also be made. For instance, one of the plates can be maintained in its initial flat state while only the opposed one is expanded by the hydrostatic pressure. As a variation on this, one portion of one plate can be flat while the opposed portion of the other can be expanded. Then the arrangement can be reversed through the remaining portions of both plates.

From the foregoing it will be readily apparent that dimple plate heat exchange elements, strengthened and stiffened to withstand without collapse or distortion the pressure differential for which they have been designed, can be quickly and economically formed by the method and apparatus of the invention. Though a limited number only of element formations has been shown, it is to be understood that this showing is merely illustrative.

As regards the apparatus for forming the elements, any suitable means can be used to keep the fixture assembly in tight assembly relationship while the hydrostatic pressure is introduced within the space between the plates. In fact, the outside pressure can be applied by mechanical means, such as by the use of a normal heavy press, in place of the pressure chambers 9 and 10. The application of hydrostatic pressure for both the internal expanding action and the external holding action, can be done by employing various elements differing structurally from those here illustrated as would suggest themselves to those skilled in the art.

In other respects also it is to be understood that the showing in the accompanying drawing and the foregoing description thereof are directed to the presently preferred embodiment of the invention. It is to be understood, however, that such showing and description are for illustrative and not limiting purposes, and that modifications and variations thereof might well occur to those skilled in the art without departing from the spirit and scope of the invention.

I claim:

1. Those steps in the method of forming opposed plate heat exchanger elements with the opposed plates having a series of pairs of opposed aligned dimples spacing the plates apart, with the remainder of the space between the opposed plates providing unobstructed fluid passages, from pairs of deformable steel plates secured and sealed together solely around their peripheries leaving the zone within the peripheries free to accommodate flow and with an opening in the form of a port communicating through said peripheries with said unsecured interior zone between such plates which comprise, supporting said plates exteriorly at spaced substantially point positions within such peripheries while leaving the remaining areas of said plates free from restraint, applying pressure hydrostatically at said spaced positions to tightly and frictionally hold said plates together at said spaced positions with uniform pressure, introducing hydrostatic pressure through said port into said interior zone between said plates and expanding the unsupported areas of said plates between said spaced positions away from each other by said hydrostatic pressure while allowing the metal to flow throughout said plates and continuing said expanding to an extent just beyond the yield point of the metal.

2. The method as in claim 1 and including forming said dimples with flat engaging sections.

3. The method as in claim 1 and including applying said hydrostatic pressure to effect said holding prior to the introduction of hydrostatic pressure between said plates through said port.

4. The method as in claim 3 and including applying greater unit hydrostatic pressure for said holding than for said expanding.

5. The method as in claim 1 and applying said hydrostatic pressure to a resilient member and employing said resilient member to hold said plates together.

6. The method as in claim 1 and including leaving said peripheries of said plates free and unsupported during said expanding.

7. The method as in claim 1 and including welding said pairs of opposed dimples together after said plates have been fully expanded.

References Cited

UNITED STATES PATENTS

| | | | |
|---|---|---|---|
| 1,685,388 | 9/1928 | White. | |
| 1,709,865 | 4/1929 | Muffly. | |
| 3,024,002 | 3/1962 | Beck | 29—157.3 X |
| 2,993,263 | 7/1961 | Staples | 29—157.3 |
| 3,053,211 | 9/1962 | Gahlinger | 29—157.3 X |
| 3,094,956 | 6/1963 | Pauls' | 29—157.3 X |

JOHN F. CAMPBELL, Primary Examiner

D. C. REILEY, Assistant Examiner

U.S. Cl. X.R.

29—421; 72—465; 113—118